United States Patent
Roman et al.

(10) Patent No.: US 10,365,932 B2
(45) Date of Patent: Jul. 30, 2019

(54) DYNAMIC APPLICATION CUSTOMIZATION FOR AUTOMATED ENVIRONMENTS

(71) Applicant: Essential Products, Inc., Palo Alto, CA (US)

(72) Inventors: Manuel Roman, Sunnyvale, CA (US); Mara Clair Segal, San Francisco, CA (US); Dwipal Desai, Palo Alto, CA (US); Andrew E. Rubin, Los Altos, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

(21) Appl. No.: 15/672,216

(22) Filed: Aug. 8, 2017

(65) Prior Publication Data

US 2018/0210740 A1    Jul. 26, 2018

Related U.S. Application Data

(60) Provisional application No. 62/540,006, filed on Aug. 1, 2017, provisional application No. 62/512,658, filed
(Continued)

(51) Int. Cl.
*G06F 9/46* (2006.01)
*G06F 9/445* (2018.01)
(Continued)

(52) U.S. Cl.
CPC .... *G06F 9/44505* (2013.01); *G06F 17/30002* (2013.01); *G06N 3/02* (2013.01); *H04L 67/125* (2013.01); *H04L 67/141* (2013.01); *H04L 67/16* (2013.01); *H04L 67/2819* (2013.01); *H04L 67/34* (2013.01); *G06F 2209/482* (2013.01)

(58) Field of Classification Search
None
See application file for complete search history.

(56) References Cited

U.S. PATENT DOCUMENTS 6,393,496 B1 * 5/2002 Schwaderer ............ G06F 9/541
719/322
6,507,762 B1 1/2003 Amro et al.
(Continued)

OTHER PUBLICATIONS

Bandara et al. "Access Control Framework for API-Enabled Devices in Smart Buildings", 2016 IEEE, pp. 210-217.*
(Continued)

*Primary Examiner* — Van Nguyen
(74) *Attorney, Agent, or Firm* — Perkins Coie LLP

(57) ABSTRACT

The present disclosure contemplates a variety of improved methods and systems for controlling a variety of disparate home devices coupled to the framework and/or ambient operating system (AmbientOS). This home application programming interface (API) exposes the operation of the home devices in a natural and intuitive manner, facilitating control of unknown devices by high level commands. The home devices are contextually responsive to API commands. Additionally, the home application programming interface can customizing an application developed to control devices in an environment to control the devices in the environment via an assistant device with artificial intelligence (AI) capabilities.

25 Claims, 9 Drawing Sheets

Related U.S. Application Data on May 30, 2017, provisional application No. 62/449,492, filed on Jan. 23, 2017.

(51) Int. Cl.
  *G06F 17/30* (2006.01)
  *H04L 29/08* (2006.01)
  *G06N 3/02* (2006.01)

(56) References Cited

U.S. PATENT DOCUMENTS

| | | | | |
|---|---|---|---|---|
| 6,546,419 | B1* | 4/2003 | Humpleman | H04L 12/2803 348/E7.05 |
| 7,243,355 | B2* | 7/2007 | Espino | G06F 9/548 707/999.003 |
| 8,613,002 | B2* | 12/2013 | Narayanan | G06F 9/542 719/328 |
| 9,621,433 | B2* | 4/2017 | Yoshida | G06F 3/0482 |
| 9,747,083 | B1 | 8/2017 | Roman et al. | |
| 9,838,830 | B2* | 12/2017 | Lyons | H04W 4/008 |
| 9,846,577 | B1* | 12/2017 | Riedl | G06F 8/65 |
| 2002/0056112 | A1 | 5/2002 | Dureau et al. | |
| 2007/0083827 | A1 | 4/2007 | Scott et al. | |
| 2010/0036667 | A1 | 2/2010 | Byford et al. | |
| 2013/0311946 | A1 | 11/2013 | Kwon et al. | |
| 2014/0074483 | A1 | 3/2014 | Van Os et al. | |
| 2014/0218372 | A1 | 8/2014 | Missig et al. | |
| 2015/0095790 | A1 | 4/2015 | Yoshida et al. | |
| 2015/0162000 | A1 | 6/2015 | Di Censo et al. | |
| 2015/0373149 | A1* | 12/2015 | Lyons | G05B 15/02 709/203 |
| 2015/0373183 | A1 | 12/2015 | Woolsey et al. | |
| 2016/0042737 | A1 | 2/2016 | Emerick et al. | |
| 2016/0098992 | A1 | 4/2016 | Renard et al. | |
| 2016/0203415 | A1 | 7/2016 | Chaiyocharlarb et al. | |
| 2016/0378747 | A1 | 12/2016 | Orr et al. | |
| 2017/0133012 | A1 | 5/2017 | Ho et al. | |
| 2017/0133013 | A1 | 5/2017 | Tsai et al. | |
| 2017/0351505 | A1 | 12/2017 | Riedl | |

OTHER PUBLICATIONS

Sohn et al. "Device Control with Scriptable-API Using Web Based Framework", 2008 IEEE, 2 pages.*

Non-Final Office Action dated Dec. 21, 2017 for U.S. Appl. No. 15/696,033 of Roman, M. et al., filed Sep. 5, 2017.

Notice of Allowance dated Jan. 26, 2018 for U.S. Appl. No. 15/696,010 of Roman, M., et al. filed Sep. 5, 2017.

Notice of Allowance dated Jul. 26, 2017 for U.S. Appl. No. 15/608,954 of M. Roman, et al. filed May 30, 2017.

U.S. Appl. No. 15/667,351 of Roman, M. et al., filed Aug. 2, 2017.

U.S. Appl. No. 15/696,010 of Roman, M. et al., filed Sep. 5, 2017.

U.S. Appl. No. 15/696,033 of Roman, M. et al., filed Sep. 5, 2017.

Final Office Action dated May 9, 2018 for U.S. Appl. No. 15/696,033 of Roman, M. et al., filed Sep. 5, 2017.

International Search Report and Written Opinion dated Feb. 6, 2018 for International Patent Application No. PCT/US18/013363, 9 pages.

Notice of Allowance dated Mar. 1, 2018 for U.S. Appl. No. 15/696,010 of Roman, M., et al. filed Sep. 5, 2017.

Notice of Allowance dated May 3, 2018 for U.S. Appl. No. 15/667,351 of Roman, M. et al., filed Aug. 2, 2017.

\* cited by examiner

DYNAMIC APPLICATION CUSTOMIZATION FOR AUTOMATED ENVIRONMENTS

CROSS-REFERENCE TO RELATED APPLICATION(S)

This application claims priority to U.S. Provisional Patent Application No. 62/540,006, entitled "HOME API," by Roman et al. filed on Aug. 1, 2017, U.S. Provisional Patent Application No. 62/512,658, entitled "HOME DEVICE APPLICATION PROGRAMMING INTERFACE," by Roman et al. filed on May 30, 2017, and U.S. Provisional Application No. 62/449,492, entitled "HOME API," by Roman et al. filed on Jan. 23, 2017, all of which are incorporated herein by reference in their entirety.

TECHNICAL FIELD

The present disclosure contemplates a variety of improved methods and systems for controlling a variety of disparate home devices coupled to the framework and/or ambient operating system.

BACKGROUND

The Internet of Things (IoT) allows for the internetworking of devices to exchange data among themselves to enable sophisticated functionality. For example, assistant devices configured for home automation can exchange data with other devices to allow for the control and automation of lighting, air conditioning systems, security, etc. Existing solutions require users to select individual devices and ascribe settings to them one-by-one, potentially within a menu format.

SUMMARY

The present disclosure contemplates a variety of improved methods and systems for controlling a variety of disparate home devices coupled to the framework and/or ambient operating system (AmbientOS). This home application programming interface (API) exposes the operation of the home devices in a natural and intuitive manner, facilitating control of unknown devices by high level commands. The home devices are contextually responsive to API commands.

Some of the subject matter described herein includes a method for customizing an application developed to control devices in an environment via an assistant device with artificial intelligence (AI) capabilities. The method can include initializing, by a processor, the application developed to control the devices in the environment, the application having a functionality and associated device properties identifying the devices in the environment; determining, using a customization identifier associated with the application, the customization identifier representing that the application has previously performed a customization which allowed the application to connect to the devices in any environment; requesting an assistant device identifier of the assistant device in the environment, the assistant device identifier representing a unique identifier associated with the assistant device; determining that the assistant device identifier of the assistant device matches the assistant device identifier of the assistant device with which the application has previously been customized; requesting information from the assistant device about a subset of the devices connected to the assistant device in the environment, the information including a device identifier, a device type, a device category, and a date of update, wherein the date of update includes one or more of date of installation, or date of configuration; determining that one of the device identifier, the device type, the device category, or the date of update does not match customization information stored in a database associated with the application, the database storing the information about a second subset of the subset of the devices which were previously used in the customization; performing a second customization based on the determination that the one of the device identifier, the device type, the device category, or the date of update does not match the customization information, wherein the second customization includes: identifying a third subset of devices of the subset of devices of the devices connected to the assistant device which is associated with one of device identifier, the device type, the device category, or the date of update which does not match the customization information stored in the database associated with the application, wherein the third subset of devices does not include the second subset of devices; determining that the device properties of the application match the device type, and the device category of a device of the devices; and provide a reference to an adapter stored on the assistant device to the application associated with the third subset of devices in the environment, wherein the adapter is capable of controlling the device to perform the functionality association with the application; and updating the customization information stored in the database associated with the application to reflect the third subset of devices identified as being connected to the assistant device; and performing the functionality of one of the devices of the third subset of devices in response to a request from the application.

Some of the subject matter described herein includes a method for customizing an application developed to control devices in an environment via an assistant device with artificial intelligence (AI) capabilities, comprising: initializing, by a processor, the application developed to control the devices in the environment, the application having a functionality and associated device properties identifying the devices in the environment; determining that the application has not been previously customized by analyzing customization information, wherein the customization represents allowing the application to connect to the devices in the environment; performing the customization including: identifying the devices connected to the assistant device in the environment matching the functionality and the device properties identified in the application; providing a reference to an adapter stored on the assistant device to the application associated with the devices in the environment, wherein the adapter is capable of controlling a device to perform the functionality associated with the application; and updating the customization information stored in association with the application to reflect that the customization was performed; and performing the functionality of one of the devices in response to a request from the application.

Some of the subject matter described herein includes a system for customizing an application developed to control devices in an environment via an assistant device with artificial intelligence (AI) capabilities, comprising: one or more processors; and a memory storing instructions, wherein the processor is configured to execute the instructions such that the processor and memory are configured to: initialize the application developed to control the devices in the environment, the application having a functionality and associated device properties identifying the devices in the environment; determine that the application has not been previously customized by analyzing customization information, wherein the customization represents allowing the application to connect to the devices in the environment; perform the customization including: identify the devices connected to the assistant device in the environment matching the functionality and the device properties identified in the application; provide a reference to an adapter stored on the assistant device to the application associated with the devices in the environment, wherein the adapter is capable of controlling a device to perform the functionality associated with the application; and update the customization information stored in association with the application to reflect that the customization was performed; and perform the functionality of one of the devices in response to a request from the application.

DETAILED DESCRIPTION

This disclosure contemplates a variety of improved methods and systems of an environment associated with an assistant device. In at least one embodiment, the home assistant device can include a home device application programming interface (Home API). The described API can include communication between devices and communication between the assistant device and devices in the home environment. The API can be associated with development tools including procedures for developing, debugging, and testing applications, apps, and/or commands to customize a user's home. For example, a developer wanting to create an application for controlling all lighting devices in the home can use the developer environment to create the application. In at least one embodiment, the home can be the environment surrounding the assistant device such as a house, an office, a car, and/or a store. The generated applications can include mobile applications (apps).

An environment can include many different electronic devices capable of providing different functionalities. For example, a home environment can include lights, thermostat, a smart TV, and a coffee maker. These devices can be given different functionalities such as turning on the lights, changing the temperature, turning off the news, and making coffee. The devices can be configured to connect (e.g., via Wi-Fi, Bluetooth, etc.) to the assistant device, and the assistant device can be configured to control the devices. For example, a user can tell the assistant device "please turn off the TV"; in response, the assistant device can send a request to the TV, causing the TV to be turned off. In another example, the user can tell the assistant device "please turn off all the lights in the home"; in response, the assistant device can send a request to all the lights, causing all the lights in the home environment to be turned off. This configuration can save the user time by controlling devices through the assistant device instead of physically operating the individual devices.

The developer environment, including the API, allows users and/or developers to build on the assistant device infrastructure by providing development tools, routines, protocols, and resources to simplify developing, debugging, and testing applications, apps, and/or commands to customize their homes. For example, the developer can use the home API to create an application for a smartphone (communicatively coupled to the assistant device) which can control all the lights in the home.

Figure 1:
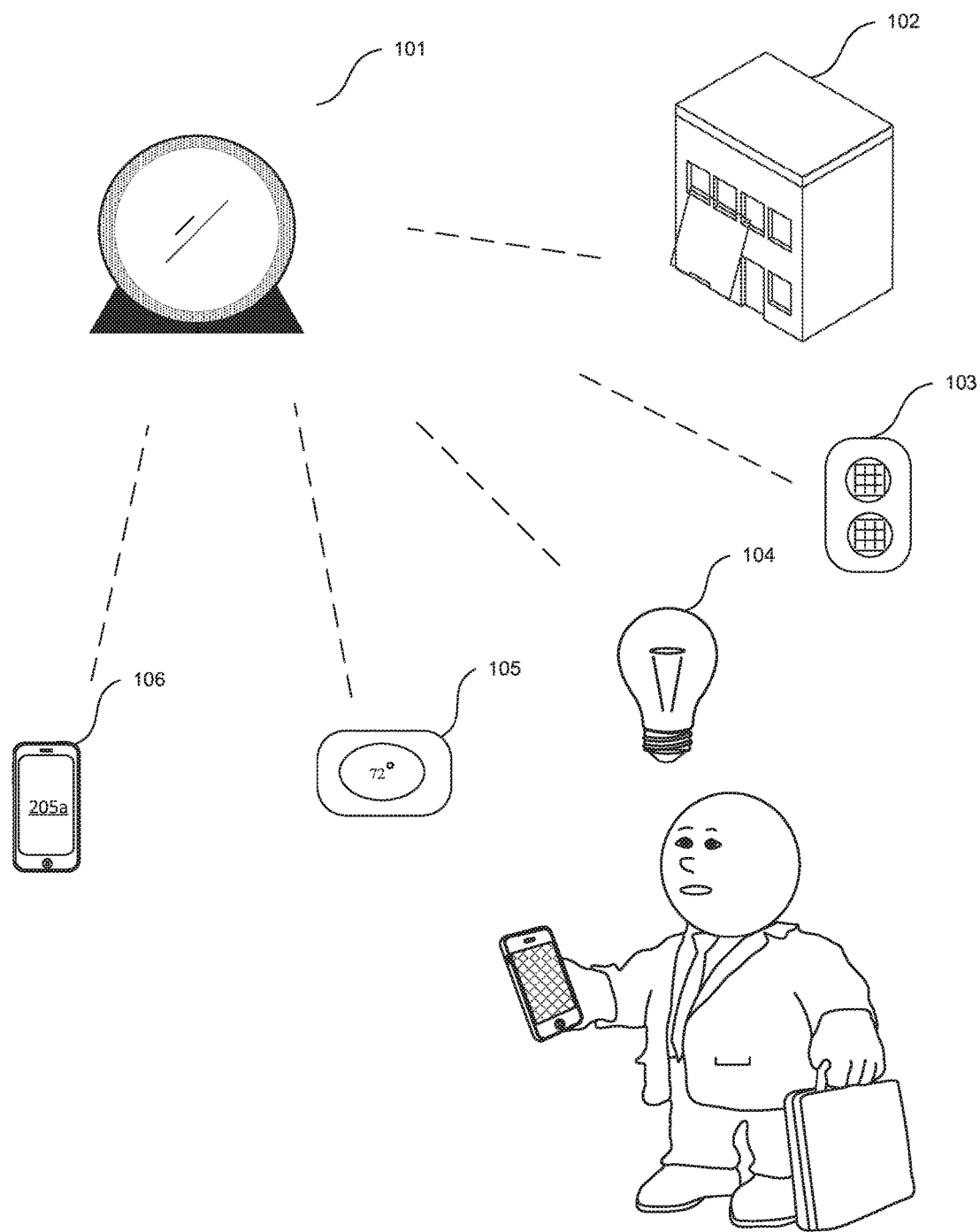
FIG. 1 illustrates an embodiment of the assistant device connected to other devices.

FIG. 1 illustrates an embodiment of the assistant device connected to other devices. The assistant device 101 is connected to one or more devices. Devices can include one or more connected devices such as garage doors 102, speakers 103, lights 104, thermostats 105, and mobile devices 106. Devices can also include household appliances such as freezers, ovens, air purifiers, washers, and dryers. In at least one embodiment, the devices are devices such as wearable devices, and/or robots such as robotic vacuums.

Devices can be connected to the assistant device physically and/or via a wireless signal. In at least one embodiment, the wireless signal can include one or more of Long-Term Evolution (LTE), LTE-Advanced, Wi-Fi, Bluetooth, ZigBee, EnOcean, Personal area networks, TransferJet, Ultra-wideband, WiMAX, HiperMAN, Li-Fi and/or infrared radiation (IR).

Each connected device can be controlled using an associated adapter and/or driver. The adapter can be device-specific and, in at least one embodiment, functionality specific. For example, a thermostat may have an associated adapter which the assistant device can use to operate or control the thermostat. In an example, the assistant device may have an adapter for each of the functionalities of the thermostat (e.g., raise temperature, lower temperature, turn on fan, etc.). The adapters can be stored on local resources (e.g., assistant device memory, assistant device external memory, etc.) and/or on remote resources (e.g., cloud, etc.).

Connected devices can be controlled by the user via the assistant device. For example, a user can instruct the assistant device verbally "assistant device, please turn on the television." In response, the assistant device can parse the user instruction using a speech recognition algorithm. The voice activatable command "turn on" and the device description "television" can be used to identify the specific device. The assistant device can then transmit a command to the television requesting it to perform the function of "turning on," thereby causing the television to turn on.

In at least one embodiment, the speech recognition algorithm can include one or more of Hidden Markov models, dynamic time warping-based speech recognition, neural networks, deep feedforward neural networks, end-to-end Automatic Speech Recognition (ASR), and/or other similar algorithms.

In at least one embodiment, when the assistant device is launched for the first time in a new environment, an active space manager service is initiated. The active space manager can identify the devices in the environment. In at least one embodiment, the active space manager identifies the layout of the environment (i.e., devices and their locations in the environment). The active space manager can determine the devices that are in the home and identify those devices for the purposes of security as devices that are permitted in the environment and identify those devices with the active space profile. The devices which come into the environment after the active space profile has been established may need to perform an authentication process to be allowed to interact with the assistant device. The authentication process can include authenticating the device using an administrative password, and/or biometric authentication (i.e., visual recognition, voice recognition, etc.). In at least one embodiment, creating an active space profile can include assigning certificates to devices in the environment.

In at least one embodiment, the assistant device can initiate the whole model service which can identify the location of the house, the layout of the house, and the rooms of the house. The assistant device can determine the location of the house using geolocation information (i.e., GPS), IP address information, and information gathered from the user such as queries provided by the user (i.e., "what's the weather in San Francisco?"). Furthermore, the assistant device can identify the layout of the house using input such as video, audio, and infrared (IR) input. The information gathered using the whole model service can be used to determine information about connected devices in the environment such as the room with which the device is associated (i.e., kitchen, kid's room, master bedroom, etc.).

The environment can include multiple assistant devices. In an environment with multiple assistant devices, one assistant device can be designated as the controller, and the other devices can be designated as peripheral devices. The controller device can be configured to have unidirectional control over the peripheral devices. A controller state synchronizer service can synchronize the state of the controller and if the controller becomes unavailable, the controller state synchronizer service can designate one of the peripheral devices as a controller device. The information associated with the controller device can be stored on the cloud and/or on a peripheral device so that when the controller device becomes unavailable, the information can be used by the new controller device.

Figure 2:
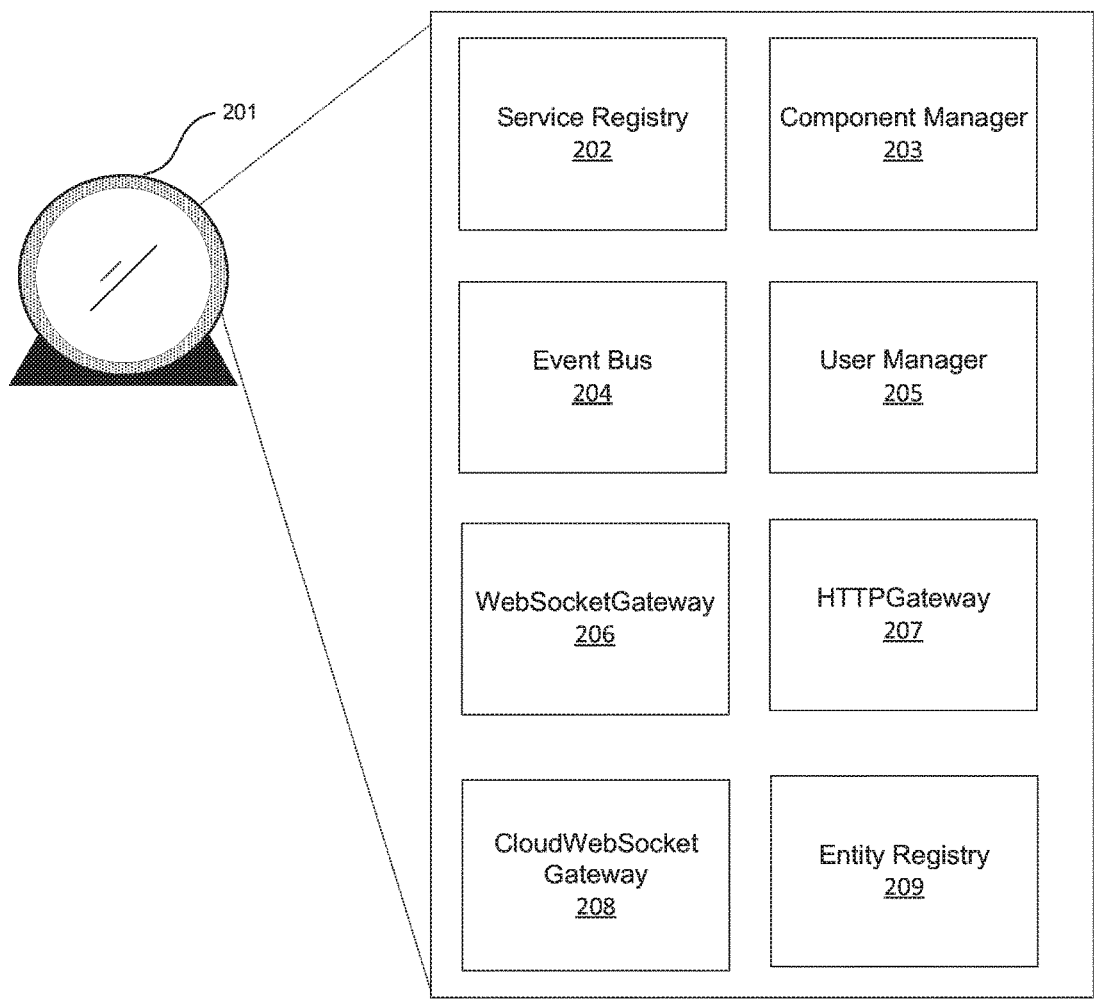
FIG. 2 illustrates core services that can run on the assistant device.

FIG. 2 illustrates core services that can run on the assistant device 201. Service Registry 202 can maintain a list of running microservices and provides an API to register and browse them. Once a component is initiated, it can initiate an associated one or more microservices. The running microservices associated with the component can be listed in the service registry.

Component Manager 203 can be responsible for validating, installing, uninstalling, and browsing components as well as providing the runtime environment to instantiate these components. A component is a package that includes resources that can be deployed into the framework. In at least one embodiment, the component can include information or computer code used to operate a feature of the framework. In at least one embodiment, once the component is executed, it initializes one or more microservices.

Event Bus 204 can be responsible for implementing communication channels. The Event Bus can include multiple channels, each channel having published information. In at least one embodiment, the Event Bus includes a mechanism that has publishers and subscribers. For example, the Event Bus can include a special channel for weather where weather information can be published by a weather service and/or collected by subscribers. An application or subscriber looking for the weather can access the weather channel of the Event Bus and identify the latest weather. In another example, a special channel can be associated with discovery requests. In the example, adapters can listen to the channel and once an application publishes a request for discovery, the adapters will begin discovering devices. In at least one example, the adapters can post a message to a designated Event Bus channel when devices are discovered. In at least one embodiment, the active listening feature can collect assistant device input and post the information on the Event Bus. The services can monitor the Event Bus for information and be initialized when information causing the initialization of the service is identified on the Event Bus.

User Manager 205 can be responsible for providing the functionality to create, browse, edit, and remove users. In at least one embodiment, when a user is added, the user information is stored in the user manager. The user manager can include user profiles such as usernames, user biometric information, and/or permissions to access services, microservices, entities, etc.

Ambient OS or the framework can be transport agnostic and rely on gateways to implement the underlying protocols to communicate with the system. Microservices can be decoupled from the transport so the same code works with different protocols. Ambient OS provides the following gateways.

WebSocketGateway 206 can rely on WebSockets as the communication protocol among components. In at least one embodiment, the WebSocketGateway can be used to implement asynchronous messaging. Asynchronous messaging can include communication between two applications or devices; the communication can include a message being transmitted and not waiting for a reply to continue. In at least one embodiment, the WebSocketGateway can be used to implement synchronous messaging.

HTTPGateway 207 can provide the functionality required to serve WebApps that leverage Ambient OS microservices and expose an HTML-based GUI to users. For example, a timer WebApp displays an HTML page with a counter. This HTML page interacts with a timer service to set the countdown time, start, and stop the timer. Furthermore, the page listens to a channel, to get a notification from the timer service when time is up, and updates the UI accordingly.

CloudWebSocketGateway 208 can connect to a service running on Amazon Web Services (AWS) to enable remote interaction via the cloud. To enable ambient computing, Ambient OS introduces the concept of "entities". An entity is the digital representation of any object present in the environment that can be manipulated. In at least one embodiment, the CloudWebSocketGateway can be used by devices outside the environment to access the devices within the environment. For example, a user can access the environment by accessing the cloud, and the user can operate the devices via the cloud (i.e., turn off lights, adjust thermostat) while outside the environment.

Entity Registry 209 can maintain a list of entities present in the environment and provides an API to register, browse, annotate, and remove entities. The entity registry relies on a specific microservice type called an "adapter". The entity registry can include a list of all devices. In at least one embodiment, the entity registry includes a list of devices connected to the home assistant device. The entity registry can store a list of adapters associated with connected devices. In an embodiment, when an adapter identifies a device in the environment of the assistant device, the adapter registers the device in the entity registry. In at least one embodiment, the adapter can create an object in the entity registry which represents the identified device. The entity registry can store the list of the devices in a database. Some examples of entities include thermostat, light, door lock, TV, and speaker.

In at least one embodiment, the assistant device can access a database associated with the entity registry which stores a list of connected devices and one or more of the associated adapters, one or more voice activatable commands, activity types, device descriptions, device categories, and/or device location. The database can also be stored on the local resources of the assistant device. In at least one embodiment, the database can be stored externally from the assistant device. For example, the database entry associated with the thermostat can be a reference to the thermostat adapter, voice activatable commands (e.g., "set temperature," "turn on fan," etc.), device description (e.g., "thermostat"), device category (e.g., "temperature regulation"), and/or device location (e.g., "living room," etc.).

Figure 3:
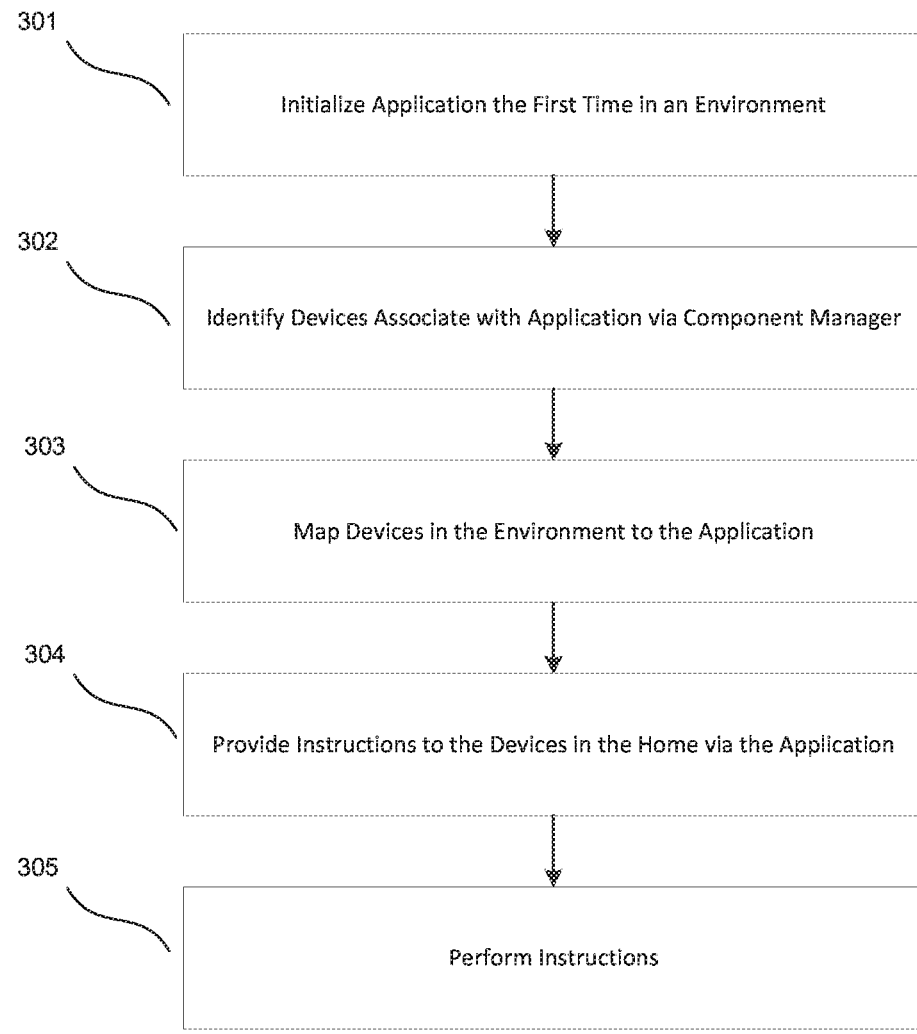
FIG. 3 illustrates an example of the application workflow.

FIG. 3 illustrates an example of the application workflow. An application can include references to devices. In some embodiments, the developer does not know which devices the user has in the home environment. At step 301, the application can be initialized for the first time in the environment. In at least one embodiment, the application can automatically determine that it is in the new environment. For example, an application that had previously run in the user's home having the assistant device can initialize for the first time when brought into the user's work environments. The application can determine that it is being initialized for the first time by detecting a new environment. The new environment can be detected by identifying a threshold of new devices in the environment and/or by identifying a new assistant device in the environment. When a user moves the assistant device to a new environment, and opens the application, the application can determine that it had previously connected to the assistant device. The application can further determine that a threshold number (i.e., 50%, 5 devices, 10 devices, etc.) of devices in the environment are ones to which the application has not connected, and therefore the application can determine that that it is being initialized for the first time in an environment.

In response to the application being initialized for the first time in the environment 301. Properties of devices (e.g., requirements) associated with the application can be identifies using the component manager 302. In at least one embodiment the component manager is initialized by the AmbientOS. The component manager can review the requirements of the application. In at least one embodiment, the component manager can identify the application requirements (e.g., devices). Requirements of the application can include properties of devices associated with requests by the application. Properties can include information about devices such as device category. For example, an application can have a button that when pressed turns on the lights; therefore, the property and/or device category associated with the application can include "light." Thus, the component manager can identify that the property associated with the application is light and can check the entity registry associated with the environment of the assistant device for one or more entities having the property "light." At least one embodiment of the property can include a location. For example, a kitchen light may have an associated set of attributes "kitchen" and "light." In at least one embodiment, the component manager may prompt the user when a device with requirements as indicated by the application is not found in the entity registry associated. In at least one embodiment the property information of devices is collected from the whole model service which can identify the location of the house, the layout of the house, and the rooms of the house in which devices are positioned. In at least one embodiment, the application can use the entity registry to obtain references to entities (e.g., devices) and the services which are required by the application and/or entity.

At step 303, the entities in the environment identified by the component manager can be mapped to the relevant properties of the application. In the example, the identified devices (entities) with a "light" attribute can be mapped to the application having a requirement of a "light" device. In at least one embodiment, where the application requirements indicate multiple parameters within an entity, the devices in the home environment which meet both parameters can be mapped to the application. For example, if an application has a requirement for a device which is both a light device and a kitchen device, then only devices which are associated with a light parameter and a kitchen parameter will be mapped to the application. Mapping can include providing the application with information necessary to access the associate device driver. In at least one embodiment, mapping can include mapping functionality of the devices required by the application to the device functionalities identified in the entity manager. The application can use the entity registry to obtain references to required entities and/or services.

At step 304, the applicant provides the instructions to one or more devices connected to the assistant device. Instructions can include the instruction to turn on the lights, to turn off the lights, lock the front door, etc. The instruction can be transmitted from the application via the home assistant device to the associated device. The instructions can include the initialization of a device adapter which can cause the connected device to perform the instruction 305. In at least one embodiment, the application can send a request to the entities to connect to the assistant device and/or the application.

Figure 4:
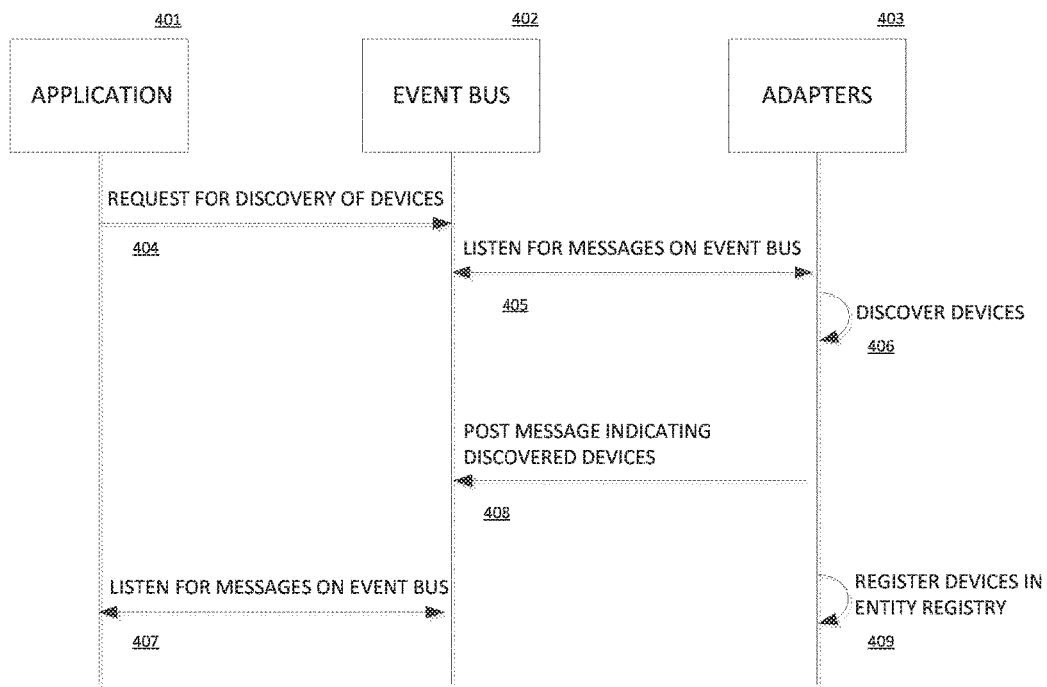
FIG. 4 illustrates an embodiment of device discovery workflow.

FIG. 4 illustrates an embodiment of device discovery workflow. An application 401 can request discovery of a device by the assistant device in the environment. The application 401 can transmit a message to the Event Bus 402 of the assistant device indicating a request for discovery of devices 404. In at least one embodiment, adapters 403 listen for messages 405 on the Event Bus. 402. Once an adapter 403 identifies a message on the Event Bus indicating a request for discovery of devices, the adapter can initiate discovery of devices 406. In at least one embodiment, the request for discovery of devices 404 can be a request for discovery of a specific type of device (i.e., speaker, lightbulb, refrigerator, etc.). In at least one embodiment, the request for discovery of devices 404 can be a request for discovery of a specific device (i.e., Philips Hue A19 Wireless lighting system, etc.).

In at least one embodiment where adapters identify a request for discovery of a specific device, the adapter associated with that specific device can be accessed or initialized and may begin to discovery procedure. In an embodiment where the adapters identify a request for a device type, the adapters associated with that device type can begin the discovery procedure.

The requests for discovery of devices can be a general request for discovery of devices. In at least one embodiment, where the request is a general request for discovery of devices, the assistant device may request that all adapters initiate the discovery of associated devices. In another embodiment where the request is a general request for discovery of devices, the assistant device may prioritize the initiation of discovery of associated devices by some adapters over other adapters. Prioritization of adapters can include prioritizing popular adapters over less popular adapters. Prioritization of adapters can also include prioritizing adapters of popular device types over adapters of less popular device types. For example, if light device types are more popular than plant watering devices, the adapters associated with light device types can be given priority to discovery devices over the plant watering device type adapters. Popularity can include the prevalence of ownership (e.g., number of devices sold in user's geographical area, number of devices sold in the world, number of devices sold in the world in a year, number of devices sold in the world in a month etc.).

Once the adapters identify devices in the home environment, then they can post messages to the Event Bus indicating discovered devices 408. The messages can include information or properties about the devices discovered (i.e., associated adapter, device type, device identifier, etc.). In at least one embodiment, the discovered device is registered in the entity registry 409, the identifier indicating (i.e., device ID) the device in the entity registry can be passed to the application via the Event Bus. In at least one embodiment, the information about the discovered devices can be manually set.

Figure 5:
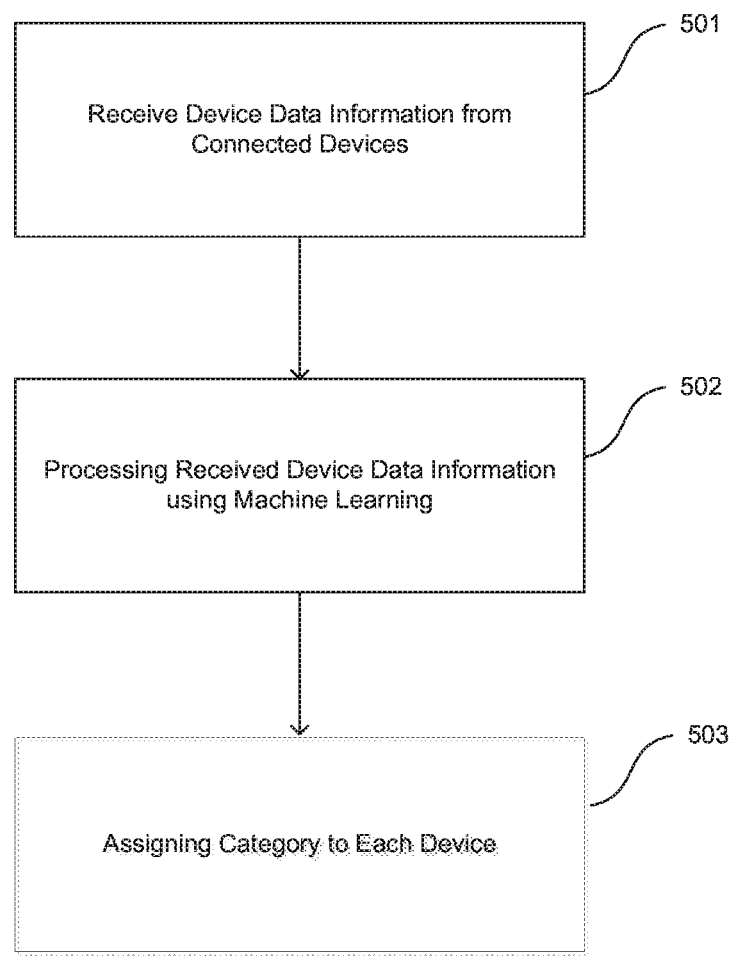
FIG. 5 illustrates an embodiment of determining device categories.

FIG. 5 illustrates an embodiment of determining device categories. The devices can collect and/or generate a significant amount of data. The device data can include and/or be used to derive contextual data about devices. Device data can include user commands to the assistant device such as "please dim living room lights when a television is turned on." In an example, the assistant device can store the request by the user to have the television turned on. The user requests and interactions with devices can be stored as device data information. In at least one embodiment, the assistant devices store only information collected from the devices such as a request to have the lights turned on. In at least one embodiment, device data can include one or more of sensor data, user manual command, user verbal command, user gesture command, settings data, status data, environmental data, and/or other data collected by the device and/or assistant device.

In at least one embodiment, the device data information is collected as demonstrated at step 501, and category information is derived using a machine learning algorithm 502. In at least one embodiment, the information collected, such as the device information collected from the connected devices, is collected and sent to the artificial intelligence engine via the WebSocketGateway.

Categories can be based on derived facets, features, contextual information, relationship information and/or semantic information. The machine learning algorithm can include one or more of decision tree learning, association rule learning, artificial neural networks, deep learning, inductive logic programming, support vector machines, clustering, Bayesian networks, reinforcement learning, representation learning, similarity and metric learning, sparse dictionary learning, genetic algorithms, rule-based machine learning, learning classifier systems, supervised learning, unsupervised learning, semi-supervised learning, clustering algorithm, and/or classification algorithm.

For example, collected device data of a thermostat can include the temperature change requests and timestamps, and collected device data from the television can include timestamps of when the device was used. The machine learning algorithm can analyze the collected device data to determine patterns. Patterns can include correlations between collected device data; for example, it can be determined that the temperature on the thermostat is always raised when the television is on. In an embodiment, the device data information can be used to determine that specific devices are in the same room or in different rooms. In an example, if a light device is always turned on when the refrigerator device is opened, it can be determined that the two devices are related. In another example, the device data information can be used to determine which devices are light devices.

The received data information can further be used to generate and/or assign categories. In at least one embodiment, the devices are categorized using device data information. The devices and/or the corresponding facets, features, contextual information, relationship information, and/or semantic information can be used to determine categories of devices 503. For example, all devices which control lights can be categorized as "lighting devices," and all devices which are determined to be in the master bedroom can be grouped as "master bedroom devices." In at least one embodiment, the devices can be members of multiple categories or properties. The device information can be stored in the entity registry or an associate database. The categories of devices and/or the corresponding facets, features, contextual information, relationship information, and/or semantic information can be performed via a machine learning algorithm. The categories can include device location, activity type, and device categories.

For example, based on the use and context, it can be determined that both the thermostat and the television are located in the living room. It can also be determined that the thermostat and television are used all day on weekends but only in the evenings during the week. This information can be saved as a weekend or weekday evening activity type. In some embodiments, the assistant device can determine that the lights in the kitchen and the lights in the living room should be assigned to the illumination device category. In at least one embodiment, a user can manually enter, delete, and/or edit the categories and names of devices.

In at least one embodiment, the functionality information is collected for each device and is made available via the Home API. In at least one embodiment, the Home API includes a list of categories including device types and/or locations. Categories can include one or more of lights, home appliances, audio devices, wearable devices, user mobile devices, plant watering devices, televisions, and/or locks. Categories or properties of devices can include locations such as home, office, bedroom, master bedroom, living room, dining room, kitchen, and/or basement. Additionally, the device types and categories can include the respective functionalities such as "open" and "closed" functionalities of blinds, which can be associated with a window coverings category. When a device is connected to one or more assistant devices, it is associated with one or more categories. Therefore, a developer does not need to know the specific devices in the one or more homes but instead can indicate the rules and commands. For example, a developer can create a rule that when a certain button on an application is pressed, all devices that intersect the categories of the bedroom and light be switched to the functionality "off." The category, device, and/or functionality information can be made available to developers on the Home API. Therefore, the developer does not need to know the devices in the home but instead can rely on the categories which can, in the future, have devices assigned. For example, the developer does not need to know the exact devices which the user will install in the bedroom but instead can rely on the knowledge that devices will be connected and assigned to the bedroom category.

In at least one embodiment, the device data collected at 501 is collected from all devices that can potentially be connected to the home assistant. For example, when a new device is introduced to the market (e.g., a new device is launched by a company, etc.) the device data is collected about the device, and one or more categories are assigned to the device. The device data can include data released by the device by the manufacturer and/or another party. The devices and the associated categories can be stored in a database. In at least one embodiment, the database is publically available. In at least one embodiment, the database is available to all developers of a Home API. In at least one embodiment, the devices are categorized for the environment such as a work environment, home environment, and car environment. In at least one embodiment the adapter can include information about the device category with which it is associated.

Figure 6:
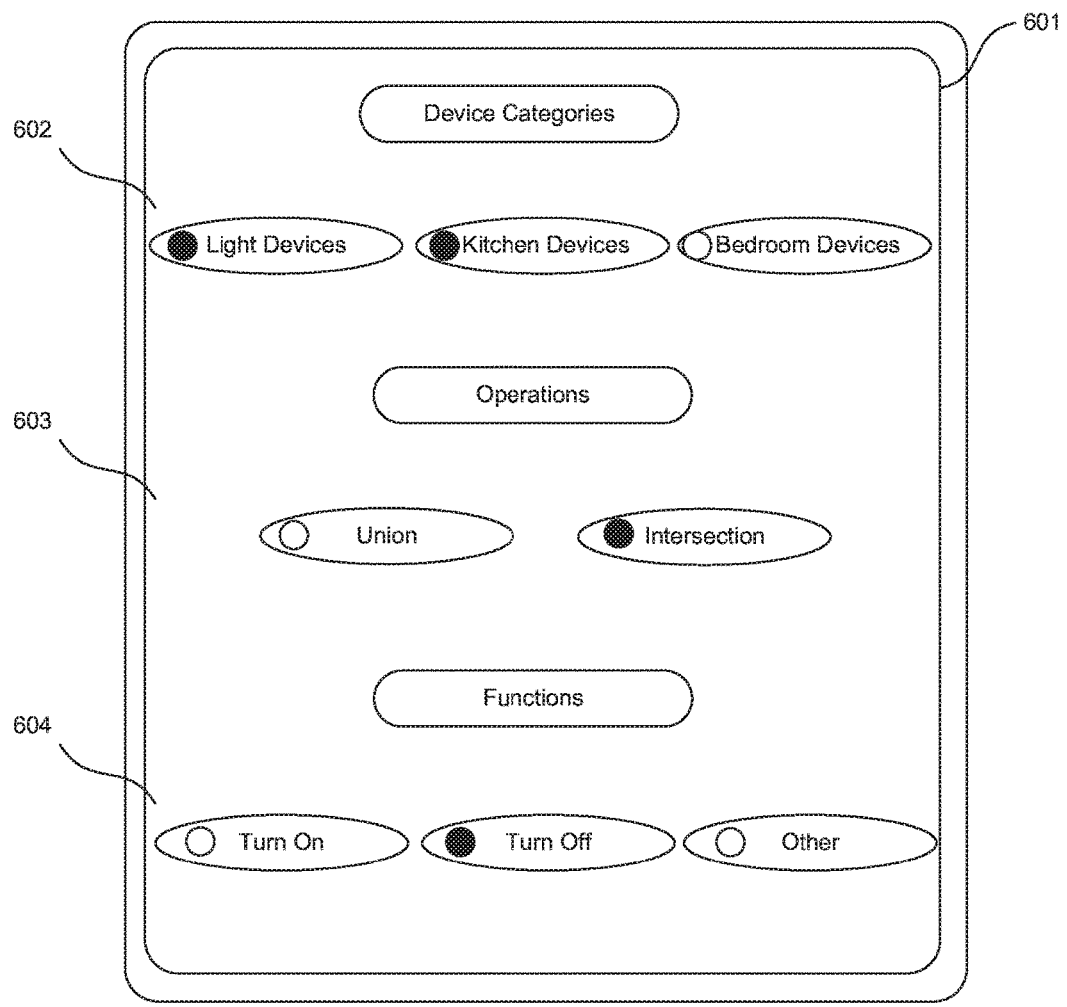
FIG. 6 demonstrates an embodiment of a Home API graphic user interface.

FIG. 6 demonstrates an embodiment of a Home API graphic user interface (GUI). A developer can use the GUI 601 to create an app. The GUI can allow a developer to generate one or more graphics or import one or more graphics. The graphic can include a layout of graphical user interface elements for the application to instruct the assistant device to control one or more devices within the environment. The graphic can be generated by creating a background and/or elements.

The developer does not need to know the devices in a specific home environment and can select the devices' categories for identification. For example, a developer intending to create an application which turns all the lights off in the kitchen does not need to know the list of all devices that can be connected as lights in the kitchen, but instead can select the intersection 603 of categories 602, light devices and kitchen devices. The Home API GUI can also allow the developer to select the function 604 of the selected device categories. For example, the developer can select the function to turn off the devices that meet the criteria of intersection of light devices and kitchen devices.

The developer can configure applications without knowledge of the devices in the home environment. The developer can use categories to identify devices and the associated functions. Categories can include location categories such as kitchen, bedroom, master bedroom, bathroom, garage, child's bedroom, guest bedroom, dining room, etc. Categories can also include device categories such as lighting devices, cooking devices, entertainment devices, television devices, office devices, etc. The devices in the home environment that meet the criteria identified in the application by the developer can be controlled using the app. For example, although a developer of the application does not know which light device is in the user's kitchen, the developer can select kitchen and lighting device categories during the application development, and this will allow the application to control the functionalities of the kitchen light which is associated with the kitchen and light categories in the home environment. In at least one embodiment, the setup process of a device in the home includes identifying one or more device categories associated with the device. These categories can then be used to identify the devices.

Furthermore, functionalities 604 can be assigned to devices. Functionalities can include any functionality a device is capable of performing such as turn on, dim, turn off, make coffee, open, etc. The functionalities displayed on the Home API 601 screen can be dynamically adjusted depending on the device category selected. For example, when a coffeemaker device category is selected, the functionalities options can be adjusted to show functionalities of coffeemaker devices such as make coffee, grind coffee, turn off, keep warm, etc.

In at least one embodiment, the Home API allows the developer to create rules with two or more IoT devices. For example, the developer can create a rule having a condition of a specific wearable IoT device reporting over 10,000 daily steps, and that when a user device is within proximity of 10 feet from the home device, the condition will trigger the assistant device to play the song "Gonna Fly Now" via an IoT device speaker.

The rules can include services such as timer services, video monitoring services, audio monitoring services, signal monitoring services, news monitoring, conflict monitoring services, or a combination thereof. A selectable item can be configured to delay (using a timer service), when selected, the performance of the functionalities by the one or more devices until a specific time is identified on a timer. For example, a developer can program a selectable item called "start making coffee in 10 minutes" to cause the coffee maker to make coffee 10 minutes after the selectable item is selected by the user. The timer service also can allow the developer to create a selectable item, which when selected, causes the assistant device to cause a device to perform a functionality for a set time (e.g., 30 seconds, 5 minutes, 2 hours, etc.), and then cause the assistant device to send a request to the device to stop performing the functionality. For example, a developer can create a selectable item which, when selected, turns the lights on for only 15 minutes, and after the 15 minutes elapse, causes the lights to turn off.

The rule can also include a video monitoring service. A selectable item can be configured, when selected, to cause devices to perform a functionality until a specific video monitoring condition is met. For example, a developer can program the selectable item, when selected, to cause an air-conditioner to turn off until someone comes home. Selecting the selectable item having a rule associated with video monitoring can cause the video monitoring service to monitor the environment for the specified condition (e.g., a person coming into the environment, etc.), and then, when the condition is met, to perform a functionality. In some embodiments, the video monitoring and the timer services can be combined in a rule condition. For example, the selectable item can be programmed to monitor the video input for a specific period of time (e.g., 45 minutes, etc.).

The signal monitoring service can monitor for devices in the home (e.g., mobile device entering the home), changes of status of devices (e.g., television turned on, thermostat turned off, etc.), or status of devices (e.g., thermostat temperature reached 72 degrees, etc.). The news monitoring service can monitor the news such as the weather channel, current events, etc. The news monitoring service can monitor one or more news services for specific situations such as natural disasters (e.g., hurricanes, tornados, earthquakes, etc.), police activity (e.g., lockdown of a neighborhood), public service announcements (e.g., brownout warnings, etc.), and/or news events (e.g., brownouts, etc.). For example, a developer can configure a selectable item that can, when selected, turn on all the lights in the house unless a brownout warning is detected by the news monitoring service, in which case the functionalities associated with the selectable item are not be performed. In some embodiments, the developer can configure the warning to be displayed to user, and the user can select to ignore it and perform the functionalities associated with the selectable item.

The conflict monitoring service associated with a rule can monitor the status of all devices in the home and determine whether the rule being invoked causes a conflict with functionalities being performed in the environment, an operation in the home, and/or the settings of one or more devices. For example, a developer can create a rule associated with a selectable item which does not allow for the bathroom lights to be turned off when the shower is running. Thus when a selectable item "turn off all lights" is selected, the conflict monitoring service determines that the shower is on. In the instant example, the developer can configure the rule to perform the functionalities associated with some devices (e.g., turn off all lights except bathroom light) or can configure the rule to not implement any functionalities associated with the selectable item when a conflict is detected. In some embodiments, the developer can configure the rule to display the conflict to the user when the conflict is detected. In some embodiments, these services are implemented using microservices.

In at least one embodiment, each selected rule and/or functionality has a corresponding mechanism which allows the assistant device to provide functionalities such as providing instructions for connected devices. Mechanisms can include remote invocation, service registration, publication, and/or subscriptions. The mechanisms can have corresponding policies. The policies can be responsible for deciding how to address events such as network errors and services behaving erratically. In at least one embodiment, the Home API allows the developer to configure the mechanisms and/or policies.

Furthermore, the rules, functionalities, and/or services can be implemented using microservices. Microservices can be addressable remote objects that encapsulate a state and expose a set of functionalities with their associated parameters that can optionally return parameters upon invocation. The microservices can communicate by fully asynchronous message passing. Microservices can be reactive or proactive. A reactive microservice waits for remote invocations to execute an action and optionally returns some values. For example, a microservice associated with a rule requiring the lights to be turned on when an icon is pressed can be a reactive microservice.

A proactive microservice can handle remote invocations, but it can also execute functionality in the background (e.g., timer service, voice recognition, etc.). For example, a reactive microservice can be associated with a rule requiring the coffee maker device to keep the coffee warm for 15 minutes (e.g., timer service counts 15 minutes to turn off the coffee device, etc.). A voice recognition service can be a background service that proactively listens to the microphone and analyzes the audio. Microservices can be packaged as components associated with device adapters. In some embodiments, the system can be configured to perform the initiated functionality or rule when a microservice is not responsive. In some embodiments, the microservice can include stateless protocol which can treat each request as an independent transaction that is unrelated to any previous request.

In an embodiment, the application can be configured not to fail when one or more microservices are unavailable.

Figure 7:
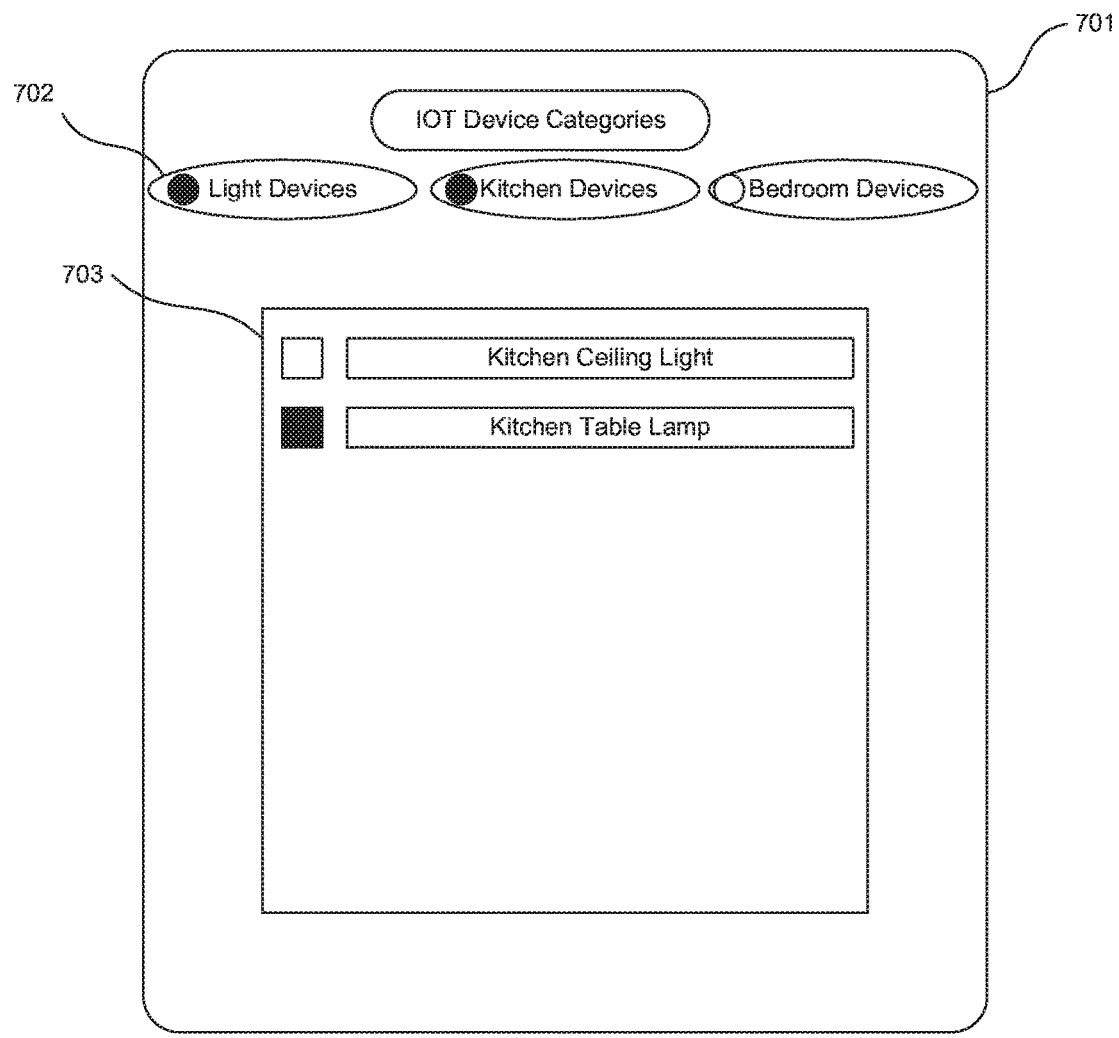
FIG. 7 demonstrates an embodiment of the Personal Home API graphic user interface.

FIG. 7 demonstrates an embodiment of the Personal Home API GUI. A Home API can be available to individuals looking to build applications to customize their homes. In at least one embodiment, an owner of an assistant device can build an application using the Personal Home API GUI 401 in her home environment. The developer (e.g., owner) can use the Personal Home API to view available devices 703 such as kitchen ceiling light and kitchen table lamp. The developer can generate applications and customize the home environment. In at least one embodiment, the developer can narrow down the list of available devices by selecting a category 702.

A developer can select a view type such as the device categories 702 (e.g., device location, device function type, etc.). In the demonstrated example, the lighting device and the kitchen device categories are selected, and all the devices that meet the criteria are displayed; see element 703. Once the element is displayed, the developer can select the device. In at least one embodiment, after selecting a device, the developer is given an option to select the available set of functions of the device. For example, after selecting kitchen table lamp, the developer can be prompted to select the function of the kitchen table lamp such as "lights on." The developer can select the function and/or device and associate it with a button and/or command on a screen.

In at least one embodiment, the Home API can allow the user to set up rules and/or conditions. The developer can select and/or enter conditional statements such as if, then, when, where, and equal. In at least one embodiment, the developer can configure rules using Boolean operators such as and, or, and not. For example, the developer can create a rule that when specific conditions are met (e.g., all lights are on, etc.) a device should perform a function (e.g., smart curtains closed, etc.). The rules can be created by a developer selecting devices, functions, operators and/or statements from a menu on a graphical user interface. The rules can be set to automatically perform a specific task when a condition is met. In at least one embodiment, the rules can be created by the developer writing code.

In at least one embodiment, the Home API allows the developer to create rules with two or more IoT devices. For example, the developer can create a rule having a condition of a specific wearable device reporting over 10,000 daily steps, and when a user device is within a proximity of 10 feet from the home device, the condition will trigger the assistant device to play the song "Gonna Fly Now" via a device speaker. In some embodiments, the rules are automatically generated based on the selected functionality and/or device category.

Rules can be automatically generated using a rule definition database having information about the device, device locations, device types, functionalities, and associated attributes. The attribute information in the rules definition database can include attribute information about which devices, device locations, device types, and functionalities conflict. Attribute information can indicate whether the devices and/or locations are security related (e.g., locks, etc.), potentially dangerous (e.g., can cause fire, etc.), incompatible (e.g., devices or functionalities that should not be used at the same, etc.), and/or time sensitive (e.g., used only between certain hours, used only for a set period of time, etc.).

The attribute information can determine the selectable item rules generated. An attribute associated with thermostat devices can specify that all thermostat devices in the environment should be set to a similar temperature. For example, a conflicting functionality can be setting a high temperature on one thermostat and setting the air-conditioner on a second thermostat in the same room. Other attribute information can exist about devices and functionalities, for example, the devices associated with security can require authentication. In some embodiments, only the "unlock" functionality of a security device can require authentication. For example, when a developer generates a selectable item "unlock lock" with the device type "lock" and functionality "unlock," a rule can automatically be generated requiring authentication. The rule can require that the video monitoring service is initiated in response to the "unlock lock" selectable item being selected, and the video monitoring service can determine whether the individual selecting the item is a primary user and/or member of the primary user group associated with the home. In some embodiments, the video monitoring service can be configured to monitor the use of the "unlock lock" selectable item and report any unusual activity to the police or all primary users of the assistant device. Unusual activity can include recognizing content in video input such as a weapon detected in the environment. Locations can indicate attributes requiring privacy, and rules can be assigned based on the location associated with the devices. For example, a rule related to a bathroom location can prohibit the use of video devices. Thus, when a developer assigns a selectable item a functionality of turning on all cameras in the environment, a rule can automatically be generated preventing the video devices in the home with a bathroom location from turning on in response to the selection of the selectable item. A rule associated with the "unlock lock" selectable item can include a signal monitoring service which determines a user's proximity to the location of the device. Signal monitoring services can determine that a user's device is too far away from the location of the device and can prevent the functionality from being implemented. For example, the user may be prevented from unlocking the lock when, based on the distance determined by the signal monitoring service, the user's device is more than a threshold distance away from the location. In an example, when the user's device is determined using the signal monitoring service not to be in the environment, then the rule may be set to prevent the user from turning on appliances such as the coffee maker. In some embodiments, the threshold distance of the user's device to the environment must be met to allow the selectable item of the application on the user's device to operate one or more associated devices.

Figure 8:
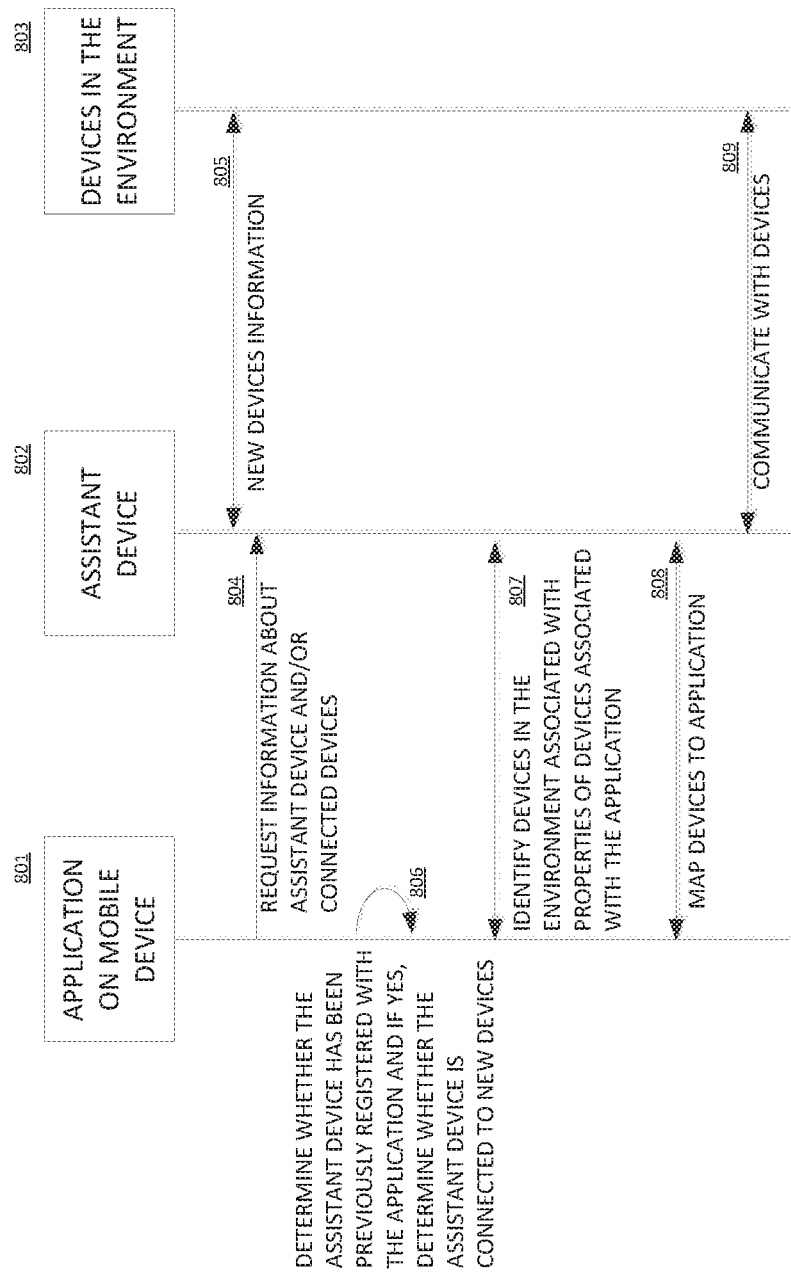
FIG. 8 illustrates an example of integrating the application with an assistant device in an environment.

FIG. 8 illustrates an example of integrating the application with an assistant device in an environment. An application 801 can be stored on a mobile device or on a device. The application 801 can reference devices based on the properties of the devices such as category, device type, and location (i.e., kitchen, light, etc.). For example, an application can reference a kitchen light without providing any further information about which exact light device should be controlled by the application. In other words, while there is a reference to the kitchen light, there is no actual device in the home environment to which it is tied. For this reason, the application can perform a customization or validation step. The validation step can identify the device in the environment 803 connected to the assistant device 802 which meets the properties of the device identified in the application. For example, the validation step can identify the kitchen lights in the environment as meeting the properties of the device because the kitchen lights are similar to the category, device, type, and/or location.

In at least one embodiment, the assistant device can store a record of all connected devices. The record can include data about the device such as the date on which the device was added, removed, etc. In the embodiment, the application can compare the last date of validation/customization against the assistant device's record of connected devices to determine whether any changes associated with the connected devices occurred since the previous validation.

In at least one embodiment, an application which had previously performed customization or validation may store an associated customization indicator of the validation and not perform validation when new devices are added. In at least one embodiment the customization identifier includes a binary indicator such as a one bit indicator. A user may manually initiate the validation on an application which had previously undergone customization to add, update, and/or remove mappings to connected devices in the environment. In at least one embodiment where the application has never been validated, the application does not determine whether the validation is required but instead initializes the validation step.

When an application is initialized, it can request information 804 from the assistant device 802. The information (can include customization information) requested from the assistant device can be identifying information such as the device ID of the assistant device. At step 806, the information can be used by the application to determine whether the application has been previously validated with said assistant device. In some embodiments, once it is determined that the application has previously been validated with the assistant device, an application can determine whether the assistant device is in a different environment than the one with which it had been previously validated and/or whether additional devices have been added to the environment since the last time the application was validated. The assistant device can identify devices in the environment which had not been previously identified 805 and register them in the entity registry associated with the assistant device 802.

In an embodiment, the assistant device can determine that it has performed the previously validation step with the assistant device however the assistant device is now in the new environment which is different from the environment when the previous validation step was performed. Thus, the application can initiate the validation step. The new environment can be determined by the assistant device sending information about the environmental profile to the application. For example, in some embodiments, the assistant device may have multiple profiles based on the location, and the profiles may have identifiers indicating the information (e.g., home, vacation home, car, work, etc.). In some embodiments, the application can determine that the assistant device is in a new environment by determining that a threshold number of the devices connected to the assistant device are devices that it had not previously identified. For example, if the application had previously performed validation with the assistant device when it was connected to three lights made by company A and a refrigerator made by company B, but now the application has detected that four lights in the environment are made by company C and no lights are made by company A, it can be determined that the assistant device is in a new environment. The threshold number can be a percentage of the new devices in the environment (i.e., 50%, 30%, etc.) and the threshold can also be a number of new devices in the environment for example 3, 4, or 10. In at least one embodiment, it is determined that the assistant device is in the new environment by identifying the properties of devices listed in the entity registry and determining that the application had previously not viewed accessed the entity registry having the properties listed in the entity register.

The validation step can be performed by the component manager. The component manager can initialize the necessary core services to perform customization (validation). At the application's initialization, the component manager can be initiated. The component manager can customize the script to match the devices in the environment and can launch the script. The matching algorithm can include matching (i.e., 100% match) and/or fuzzy matching. The matching can include matching the properties described in the application to categories identified in the entity registry. The script can perform tasks such as mapping the application to the connected devices and/or the associated adapters.

The component manager can be used when an application includes a complex functionality such as a command to the kitchen light to turn off in five minutes which requires the timer service to initialize and the adapter. The component manager can coordinate the initialization of the time service (i.e., timer, stop watch, etc.) and initialization of the adapter responsible for "turning off" functionality.

In at least one embodiment, the application can determine that although the assistant device is not in the new environment there are new devices in the environment with which the application needs to perform validation. In at least one embodiment, the application can determine that devices which had previously been mapped to the application are no longer in the environment. Once a determination is made of a change the devices in the environment, identification of a new environment, and/or a new assistant device with which the application had previously not been validated, the validation step can be performed.

The validation step can determine which devices in the environment match the properties of the devices identified in the application. The validation step can be in charge of mapping the devices listed in the application with the devices in the environment and allowing the application to control the devices in the environment. The determination of the devices in the environment which match the properties (e.g., categories) of devices identified in application can be performed by identifying the devices in the entity registry and or a database associated with the entity registry storing information about the devices such as device type location and/or category. In at least one embodiment, the connected devices are identified in the entity registry by device IDs. In some embodiments, the application stores the devices IDs of the connected device to which it had previously been mapped. Once a device in the environment is identified to match the properties of the devices listed in the application 807, the application can map the devices in the home environment to the devices identified on the application. The mapping of devices 808 can include identifying adapters associated with devices in the environment 803 and transmitting this information to the application which can store the reference to the adapters and/or the associated entity registry entry. In at least one embodiment, the application can store an environment profile with information about the adapters in the environment so that when the application is initialized and the instruction provided by the user to the application can cause the adapter of the device in the home environment to initialize and perform an action identified by the user. For example, the device identified by the application as a kitchen light can be mapped to one or more devices in the environment which have property information of lights and kitchen, the reference of the adapters of the one or more identify devices can be transmitted back to the application so that when a user instructs the application to turn on the kitchen light the adapters associated with the devices identified as the kitchen light cause the kitchen light to turn on. In at least one embodiment, the application can identified one or more devices in the entity registry.

In some embodiments, the entity registry includes devices associated with their respective adapters. The information about the adapters can be transmitted to the application. In some embodiments, the adapter information can be transmitted the application in response to identifying one or more devices in the entity registry. In at least one embodiment the information associated with the application can include requirements such as a minimum and/or the maximum number of associated devices. For example, requirements can include a minimum of 2 kitchen lights, a determination can be made by analyzing the entity registry that at a minimum number of devices in the environment meet this requirement. Thus, when the requirements are met, the identified devices can be mapped to the application. In some embodiments, once the application is validated and the entities are identified, the application use the list of entities transmit instructions to control the associated entities (devices) to the assistant device.

In at least one embodiment, the application can transmit a message to the one or more adapters of the devices in the environment via the WebSocketGateway. In at least one embodiment, a message from the application can include identifying information about a user of the application which can be compared against the user information in the user manager to determine whether the user associated with the application is permitted to control the connected device.

In at least one embodiment, the application stores profile information about the assistant devices and/or connected devices with which the validation step has previously been performed. The profile information can be stored in a database and/or another data structure associated with the application. In at least one embodiment where the application had previously performed the validation step, a subsequent performance of the validation step can create a second application profile. For example, if the application has performed the validation step to the assistant device and the associated devices in the home environment, the profile can be named the home environment.

In the example, if the application has validated the assistant device a second time in a different environment (i.e., the work environment), the application can create a second profile called the work environment with the associated mappings. In at least one embodiment, once the application is initialized, it determines whether any profiles are associated with that information collected about the environment and/or assistant device 804.

In at least one embodiment where the application determines that the validation step has previously run in the environment however a plurality of devices have since become unavailable, the application may prompt the user for permission to delete the devices. In at least one embodiment, the application may log that the devices are unavailable and keep track of the number of times the application was initialized and determined that the devices are unavailable. The application can be configured to delete the devices only after a threshold number of times that the devices are determined to be unavailable. For example, if the threshold is set to six times, when the application initializes six times and determines that the device is unavailable it can determine that the device should be deleted.

In at least one embodiment where it is determined that a device is unavailable however and alternative new device is available having similar properties, the application can determine that unavailable device has been replaced by the new device. For example, if the kitchen light device is no longer available however a new device having properties of "kitchen" and "light" is determined to exist. The application can determine that the original kitchen light device has been replaced by the new kitchen light device and map of the functionalities associated with the unavailable kitchen light device to the new kitchen light device.

In at least one embodiment, the mapping process may encounter a scenario where the application is set to control a plurality of functionalities of a device however the connected device meeting the device properties identified by the application may not have the ability to perform at least one of the plurality of functionalities. For example, the application may be set to turn on a device which has the properties of "kitchen" and "light" to the functionalities associated with blue, red, white, yellow, green, purple, and white light. However, the connected devices having identified properties of "kitchen" and "light" may only have an associated functionalities of turning on "white." The application can map only the functionalities which are able to be performed by the connected device to the application. In the example, the identified kitchen light device can be mapped to perform the turn on "white" functionality; however, it is not mapped to perform the other functionalities which it cannot perform. In at least one embodiment, the application can they kitchen light to turn on the white light for all of the six functionalities. In at least one embodiment, when a device is upgraded to include more functionalities, that application can detect that the device has been upgraded and if the upgrade enables device to perform more functionalities that application can determine whether any of the functionalities associated with the application can be updated to be mapped the functionalities associated with that device. For example, if the kitchen light device only had a white functionality but is upgraded to have read and white functionalities then the application be mapped to the kitchen light device upgraded functionalities.

In at least one embodiment, the updated device may have less functionality than the device before it was updated, and the application can determine that some of the previously mapped functionalities of the device are no longer available. The upgrade can include the device being upgraded by software and/or by replacing the device with an alternate device having the same properties (i.e., category, location, etc.). For example, upgrading light A can include replacing light A with light B. In another example, upgrading the IoT refrigerator can include a software upgrade which allows the refrigerator to not only communicate its temperature but also the weight of the products on the shelves.

Figure 9:
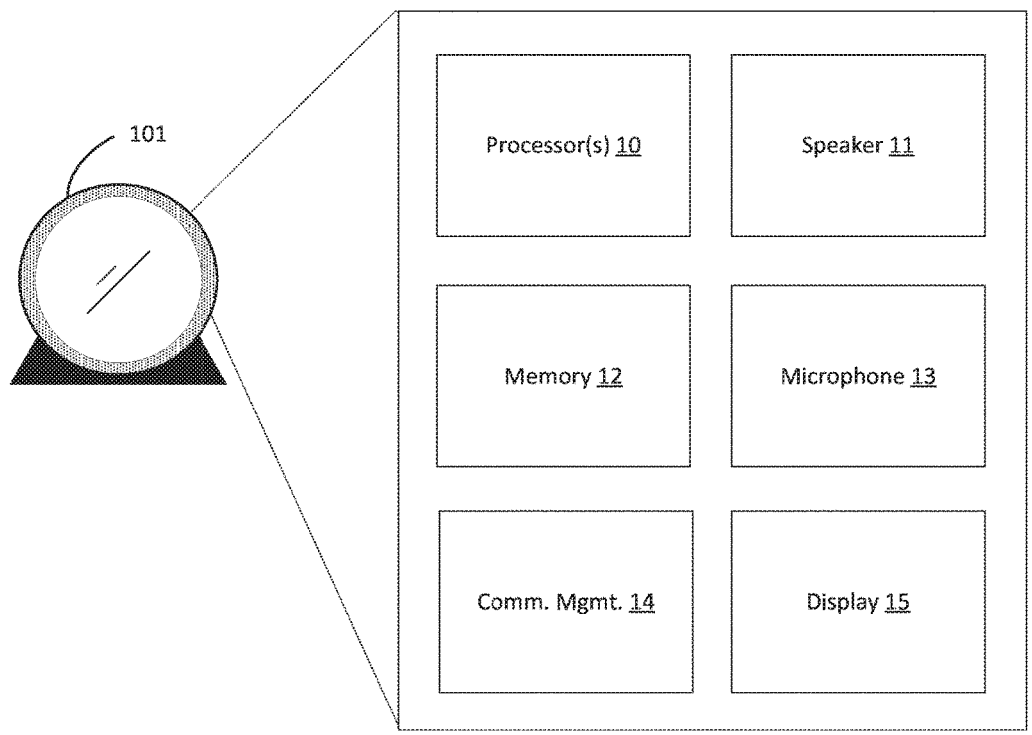
FIG. 9 illustrates an example of an assistant device.

FIG. 9 illustrates an example of an assistant device. In FIG. 9, assistant device 101 includes a processor 10, memory 12, touchscreen display 15, speaker 11, microphone 13, as well as other types of hardware such as non-volatile memory, an interface device, camera, radios, etc. to implement communication management logic 14 providing the techniques disclosed herein. Various common components (e.g., cache memory) are omitted for illustrative simplicity. The assistant device is intended to illustrate a hardware device on which any of the components described in the example of FIGS. 1-8 (and any other components described in this specification) can be implemented. The components of the assistant device can be coupled together via a bus or through some other known or convenient device.

The processor 10 may be, for example, a microprocessor circuit such as an Intel Pentium microprocessor or Motorola power PC microprocessor. One of skill in the relevant art will recognize that the terms "machine-readable (storage) medium" or "computer-readable (storage) medium" include any type of device that is accessible by the processor. Processor 10 can also be circuitry such as an application specific integrated circuits (ASICs), complex programmable logic devices (CPLDs), field programmable gate arrays (FPGAs), structured ASICs, etc.

The memory is coupled to the processor by, for example, a bus. The memory can include, by way of example but not limitation, random access memory (RAM) such as dynamic RAM (DRAM) and static RAM (SRAM). The memory can be local, remote, or distributed.

The bus also couples the processor to the non-volatile memory and drive unit. The non-volatile memory is often a magnetic floppy or hard disk; a magnetic-optical disk; an optical disk; a read-only memory (ROM) such as a CD-ROM, EPROM, or EEPROM; a magnetic or optical card; or another form of storage for large amounts of data. Some of this data is often written, by a direct memory access process, into memory during the execution of software in the computer. The non-volatile storage can be local, remote or distributed. The non-volatile memory is optional because systems can be created with all applicable data available in memory. A typical computer system will usually include at least a processor, memory, and a device (e.g., a bus) coupling the memory to the processor.

The software can be stored in the non-volatile memory and/or the drive unit. Indeed, storing an entire large program in memory may not even be possible. Nevertheless, it should be understood that for software to run, it may be necessary to move the software to a computer-readable location appropriate for processing, and, for illustrative purposes, that location is referred to as memory in this application. Even when software is moved to memory for execution, the processor will typically make use of hardware registers to store values associated with the software and make use of a local cache that, ideally, serves to accelerate execution. As used herein, a software program can be stored at any known or convenient location (from non-volatile storage to hardware registers).

The bus also couples the processor to the network interface device. The interface can include one or more of a modem or network interface. Those skilled in the art will appreciate that a modem or network interface can be considered to be part of the computer system. The interface can include an analog modem, an ISDN modem, a cable modem, a token ring interface, a satellite transmission interface (e.g., "direct PC"), or other interface for coupling a computer system to other computer systems. The interface can include one or more input and/or output devices. The input and/or output devices can include, by way of example but not limitation, a keyboard, a mouse or other pointing device, disk drives, printers, a scanner, and other input and/or output devices, including a display device. The display device can include, by way of example but not limitation, a cathode ray tube (CRT), a liquid crystal display (LCD), or some other applicable known or convenient display device.

In operation, the assistant device can be controlled by operating system software that includes a file management system, such as a disk operating system. The file management system is typically stored in the non-volatile memory and/or drive unit and causes the processor to execute the various acts required by the operating system to input and output data, and to store data in the memory, including storing files on the non-volatile memory and/or drive unit. The framework can include an operating system for the environment of a physical space such as a home, office, or a car.

Some items of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electronic or magnetic signals capable of being stored, transferred, combined, compared, and/or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, those skilled in the art will appreciate that throughout the description, discussions utilizing terms such as "processing" or "computing" or "calculating" or "determining" or "displaying" or "generating" or the like refer to the action and processes of a computer system or similar electronic computing device that manipulates and transforms data represented as physical (electronic) quantities within the computer system's registers and memories into other data similarly represented as physical quantities within the computer system's memories or registers or other such information storage, transmission, or display devices.

The algorithms and displays presented herein are not inherently related to any particular computer or other apparatus. Various general-purpose systems may be used with programs in accordance with the teachings herein, or it may prove convenient to construct more specialized apparatuses to perform the methods of some embodiments. The required structure for a variety of these systems will be apparent from the description below. In addition, the techniques are not described with reference to any particular programming language, and various embodiments may thus be implemented using a variety of programming languages.

In further embodiments, the assistant device operates as a standalone device or may be connected (e.g., networked) to other machines. In a networked deployment, the assistant device may operate in the capacity of a server or of a client machine in a client-server network environment or may operate as a peer machine in a peer-to-peer (or distributed) network environment.

In some embodiments, the assistant devices include a machine-readable medium. While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database and/or associated caches and servers) that store the one or more sets of instructions. The term "machine-readable medium" and "machine-readable storage medium" should also be taken to include any medium that is capable of storing, encoding, or carrying a set of instructions for execution by the machine, and which causes the machine to perform any one or more of the methodologies or modules of the presently disclosed technique and innovation.

In general, the routines executed to implement the embodiments of the disclosure may be implemented as part of an operating system or a specific application, component, program, object, module, or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally, regardless of the particular type of machine- or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disc Read-Only Memory (CD-ROMS), Digital Versatile Discs (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium may typically be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe certain principles and practical applications, thereby enabling others skilled in the relevant art to understand the subject matter, the various embodiments and the various modifications that are suited to the particular uses contemplated.

While embodiments have been described in the context of fully functioning computers and computer systems, those skilled in the art will appreciate that the various embodiments are capable of being distributed as a program product in a variety of forms and that the disclosure applies equally regardless of the particular type of machine- or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details while still being encompassed by the specification. As noted above, particular terminology used when describing certain features or aspects of various embodiments should not be taken to imply that the terminology is being redefined herein to be restricted to any specific characteristics, features, or aspects of the disclosed technique with which that terminology is associated. In general, the terms used in the following claims should not be construed to limit the disclosure to the specific embodiments disclosed in the specification, unless those terms are explicitly defined herein. Accordingly, the actual scope of the technique encompasses not only the disclosed embodiments but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the technique be limited not by this Detailed Description, but rather by any claims that issue on an application based hereon. Accordingly, the disclosure of various embodiments is intended to be illustrative, but not limiting, of the scope of the embodiments, which is set forth in the following claims.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method for customizing an application developed to control devices in an environment via an assistant device with artificial intelligence (AI) capabilities, comprising:
    initializing, by a processor, the application developed to control the devices in the environment and the environment being associated with a unique identifier, the application having a functionality of a plurality of functionalities and associated device properties identifying the devices capable of performing the plurality of functionalities in the environment;
    determining that the application has been previously customized in the environment, by analyzing customization information by determining that the application has been previously connected to the devices in the environment based on the unique identifier associated with the environment;
    requesting information from the assistant device about a subset of the devices connected to the assistant device in the environment, the information including a device identifier, a device type, a device category, and a date of update, wherein the date of update includes one or more of date of installation, or date of configuration;
    determining that one of the device identifier, the device type, the device category, or the date of update does not match the customization information stored in a database associated with the application, the database storing the information about a second subset of the subset of the devices which were previously used in the customization;
performing a second customization based on the determination that the one of the device identifier, the device type, the device category, or the date of update does not match the customization information, wherein the second customization includes:
    identifying a third subset of the subset of the devices connected to the assistant device which is associated with one of device identifier, the device type, the device category, or the date of update which does not match the customization information stored in the database associated with the application, wherein the third subset of the subset of the devices does not include the second subset of the subset of the devices;
    determining that the device properties of the application match the device type, and the device category of a device of the devices; and
    provide a reference to an adapter stored on the assistant device to the application associated with the third subset of the subset of the devices in the environment, wherein the adapter is capable of controlling the device to perform the functionality of the plurality of functionalities association with the application; and
    updating the customization information stored in the database associated with the application to reflect the third subset of the subset of the devices identified as being connected to the assistant device, the unique identifier associated with the environment and the reference to the adapter associated with the devices in the environment; and
    causing third subset of the subset of the devices to perform one of the devices to perform the plurality of functionalities in the environment responsive to a request from the application.

2. A method for customizing an application developed to control devices in an environment via an assistant device, comprising:
    initializing, by a processor, the application developed to control the devices in the environment and the environment being associated with a unique identifier, the application having a functionality of a plurality of functionalities and associated device properties identifying the devices capable of performing the plurality of functionalities in the environment;
    determining that the application has not been previously customized in the environment by analyzing customization information by determining that the application has not been previously connected to the devices in the environment based on the unique identifier associated with the environment;
    performing the customization based on the determination that the application has not been previously customized, performing the customization including:
    identifying the devices connected to the assistant device in the environment matching the functionality and the device properties identified in the application;
    providing a reference to an adapter stored on the assistant device to the application associated with the devices in the environment, wherein the adapter is capable of controlling a device to perform the functionality associated with the application; and
    updating the customization information stored in association with the application to reflect that the customization was performed by storing the unique identifier associated with the environment and the reference to the adapter associated with the devices in the environment; and
    causing the devices to perform the plurality of functionalities responsive to a request from the application.

3. The method of claim 2, wherein the customization information includes an assistant device identifier associated with the assistant device.

4. The method of claim 2, wherein the customization information includes a customization identifier.

5. The method of claim 2, wherein the customization information is stored in a database associated with the application.

6. The method of claim 2, wherein the environment includes one or more of home environment, work environment, or automobile environment.

7. The method of claim 6, wherein determining that the application has not been previously customized by analyzing the customization information includes comparing device identifiers associated with the devices connected to the assistant device and the device identifiers associated with the devices connected to the application.

8. The method of claim 2, wherein identifying the devices connected to the assistant device in the environment includes identifying the devices using an entity registry stored on the assistant device in the environment.

9. The method of claim 2, wherein identifying the devices connected to the assistant device in the environment includes information derived from a whole model service.

10. A system for customizing an application developed to control devices in an environment via an assistant device, comprising:
    a processor; and
    a memory storing instructions, wherein the processor is configured to execute the instructions such that the processor and memory are configured to:
    initialize the application developed to control the devices in the environment and the environment being associated with a unique identifier, the application having a functionality of a plurality of functionalities and associated device properties identifying the devices capable of performing the plurality of functionalities in the environment;
    determine that the application has not been previously customized in the environment by analyzing customization information by determining that the application has not been previously connected to the devices in the environment based on the unique identifier associated with the environment and stored in a database;
    perform the customization based on the determination that the application has not been previously customized, performing the customization including:
        identify the devices connected to the assistant device in the environment matching the functionality and the device properties identified in the application;
        provide a reference to an adapter stored on the assistant device to the application associated with the devices in the environment, wherein the adapter is capable of controlling a device to perform the functionality associated with the application; and
        update the customization information stored in the database associated with the application indicating that the customization was performed by storing the unique identifier associated with the environment and the reference to the adapter associated with the devices in the environment; and
    perform the functionality of one of the devices in response to a request from the application.

11. The system of claim 10, wherein the customization information includes an assistant device identifier associated with the assistant device.

12. The system of claim 10, wherein the customization information includes a customization identifier.

13. The system of claim 10, wherein the database associated with the application is stored on a cloud.

14. The system of claim 10, wherein the environment includes one or more of home environment, work environment, or automobile environment.

15. The system of claim 10, wherein determining that the application has not been previously customized by analyzing the customization information includes comparing device identifiers associated with the devices connected to the assistant device and the device identifiers associated with the devices connected to the application.

16. The system of claim 10, wherein identifying the devices connected to the assistant device in the environment includes identifying the devices using an entity registry stored on the assistant device in the environment.

17. The system of claim 12, wherein identifying the devices connected to the assistant device in the environment includes information derived from a whole model service.

18. A computer program product for customizing an application developed to control devices in an environment via an assistant device, comprising one or more non-transitory computer-readable media having computer program instructions stored therein, the computer program instructions being configured such that, when executed by one or more computing devices, the computer program instructions cause the one or more computing devices to:
    initialize the application developed to control the devices in the environment and the environment being associated with a unique identifier, the application having a functionality of a plurality of functionalities and associated device properties identifying the devices capable of performing the plurality of functionalities in the environment;
    determine that the application has not been previously customized in the environment by analyzing customization information by determining that the application has not been previously connected to the devices in the environment based on the unique identifier associated with the environment;
    perform the customization based on the determination that the application has not been previously customized, performing the customization including:
        identify the devices connected to the assistant device in the environment matching the functionality and the device properties identified in the application;
        provide a reference to an adapter stored on the assistant device to the application associated with the devices in the environment, wherein the adapter is capable of controlling a device to perform the functionality associated with the application; and
        update the customization information stored in association with the application to reflect that the customization was performed by storing the unique identifier associated with the environment and the reference to the adapter associated with the devices in the environment; and
    perform the functionality of one of the devices in response to a request from the application.

19. The computer program product of claim 18, wherein the customization information includes an assistant device identifier associated with the assistant device.

20. The computer program product of claim 18, wherein the customization information includes a customization identifier.

21. The computer program product of claim 18, wherein the customization information is stored in a database associated with the application.

22. The computer program product of claim 18, wherein the environment includes one or more of home environment, work environment, or automobile environment.

23. The computer program product of claim 22, wherein determining that the application has not been previously customized by analyzing the customization information includes comparing device identifiers associated with the devices connected to the assistant device and the device identifiers associated with the devices connected to the application.

24. The computer program product of claim 18, wherein identifying the devices connected to the assistant device in the environment includes identifying the devices using an entity registry stored on the assistant device in the environment.

25. The computer program product of claim 18, wherein identifying the devices connected to the assistant device in the environment includes information derived from a whole model service.

* * * * *